US012759479B2

(12) United States Patent
Xu

(10) Patent No.: US 12,759,479 B2
(45) Date of Patent: Oct. 13, 2026

(54) INTERIOR TRIM FOR VEHICLE, INTERIOR COMPONENT AND METHOD OF MANUFACTURING INTERIOR TRIM

(71) Applicant: FAURECIA AUTOMOTIVE INTERIOR SYSTEM (SHANGHAI) CO., LTD., Shanghai (CN)

(72) Inventor: Zhenze Xu, Shanghai (CN)

(73) Assignee: FAURECIA AUTOMOTIVE INTERIOR SYSTEM (SHANGHAI) CO., LTD., Shanghai (CN)

( * ) Notice: Subject to any disclaimer, the term of this patent is extended or adjusted under 35 U.S.C. 154(b) by 286 days.

(21) Appl. No.: 18/744,201

(22) Filed: Jun. 14, 2024

(65) Prior Publication Data

US 2024/0416848 A1 Dec. 19, 2024

(30) Foreign Application Priority Data

Jun. 14, 2023 (CN) ......................... 202310708508.6

(51) Int. Cl.

| | |
|---|---|
| ***B60R 13/02*** | (2006.01) |
| ***B32B 9/00*** | (2006.01) |
| ***B32B 9/04*** | (2006.01) |
| ***B32B 15/02*** | (2006.01) |
| ***B32B 15/20*** | (2006.01) |
| ***B60H 1/22*** | (2006.01) |

(52) U.S. Cl.

CPC .............. *B60R 13/02* (2013.01); *B32B 9/007* (2013.01); *B32B 9/041* (2013.01); *B32B 15/02* (2013.01); *B32B 15/20* (2013.01); *B60H 1/2227* (2019.05); *B32B 2605/003* (2013.01); *B60R 2013/0287* (2013.01)

(58) Field of Classification Search

CPC ............................. B60R 13/02; B60H 1/2227

See application file for complete search history.

(56) References Cited

U.S. PATENT DOCUMENTS

| | | | | |
|---|---|---|---|---|
| 10,974,663 | B2 * | 4/2021 | Cannon | B60Q 3/745 |
| 2012/0234819 | A1 * | 9/2012 | Berger | B61D 27/0045 219/213 |
| 2022/0161632 | A1 * | 5/2022 | Beau | B32B 38/0004 |

* cited by examiner

*Primary Examiner* — Huan Le

(74) *Attorney, Agent, or Firm* — Kilpatrick Townsend & Stockton LLP

(57) ABSTRACT

The present disclosure provides an interior trim for a vehicle, an interior component and a method of manufacturing an interior trim. The interior trim includes a decorative layer having an outer surface and an inner surface; and a heating configuration including a first heating layer, an electrode, and a second heating layer, and the heating configuration is located on the inner surface of the decorative layer; and the first heating layer and the second heating layer both include a heating element extending in the plane of the heating layer, and the heating element is made of heating carbon material; and the first heating layer and the second heating layer are connected with the electrode on its outer side and inner side respectively to fix the electrode, and the he first heating layer, the electrode and the second heating layer form a sandwich-like structure.

16 Claims, 4 Drawing Sheets

INTERIOR TRIM FOR VEHICLE, INTERIOR COMPONENT AND METHOD OF MANUFACTURING INTERIOR TRIM

FIELD

The present disclosure relates to an interior trim for a vehicle, an interior component and a method of manufacturing an interior trim.

BACKGROUND

In current vehicles, such as automobiles, heating provided to the occupants is realized by air conditioning of the vehicles. However, the heating effect of automobile air conditioners is slow for occupants, especially for some parts of the body, there are blind spots for heating, and the heating consumes a lot of energy, and especially will have an influence on the cruising range of electric vehicles.

In one embodiment, the air-conditioning heating scheme will generate an amount of noise, and the thermal air flow of the air-conditioning heating may also cause dryness and discomfort to the occupants' faces and eyes.

Therefore, an interior trim and an interior component for a vehicle are needed to improve the user experience of an occupant.

SUMMARY

The present disclosure provides an interior trim for a vehicle.

The present disclosure provides an interior component for a vehicle.

The present disclosure provides a method of manufacturing an interior trim for a vehicle.

The present disclosure provides an interior trim for a vehicle according to embodiments of the disclosure. The interior trim includes a decorative layer having an outer surface and an inner surface; and a heating configuration including a first heating layer, an electrode, and a second heating layer, and the heating configuration is located on the inner surface of the decorative layer; wherein the first heating layer and the second heating layer both include a heating element extending in the plane of the heating layer, and the heating element is made of heating carbon material; and the first heating layer and the second heating layer are connected with the electrode on its outer side and inner side respectively to fix the electrode, and the he first heating layer, the electrode and the second heating layer form a sandwich-like structure.

Further, in some embodiments of the present disclosure, the electrode is a copper wire mesh.

Further, in some embodiments of the present disclosure, the heating carbon material comprises at least one among carbon nanotube, carbon fiber, and graphene.

Further, in some embodiments of the present disclosure, the heating element of the first heating layer is screen-printed on the inner surface side of the decorative layer, and the heating element of the second heating layer is screen-printed on the electrode.

Further, in some embodiments of the present disclosure, the interior trim further includes a first isolating layer, and the first isolating layer is located between the first heating layer and the decorative layer, to isolate the first heating layer and the decorative layer.

Further, in some embodiments of the present disclosure, the interior trim further includes a substrate, and the substrate is set on the inner side of heating configuration, to support the heating configuration.

Further, in some embodiments of the present disclosure, the interior trim further includes a second isolating layer, and the second isolating layer is located between the second heating layer and the substrate, to isolate the second heating layer and the substrate.

Further, in some embodiments of the present disclosure, the interior trim further includes a connector connecting the electrode, and the connector being connected to an ECU to control the operation of the heating configuration.

In addition, the present disclosure provides an interior component for a vehicle according to embodiments of the disclosure, and the interior component includes the interior trim according to the above-mentioned embodiments of the disclosure, and an interior component body, and the interior trim is set on the interior component body, and the outer surface of the decorative layer of the interior trim provides at least part of a surface of the interior component.

In addition, the present disclosure provides method of manufacturing an interior trim for a vehicle according to embodiments of the disclosure, and the method includes following steps: preparing a decorative layer; preparing a first heat generating layer on the inner side of the decoration layer; setting an electrode to the first heating layer; and preparing a second heating layer to the electrode on its inner side.

DESCRIPTION OF ATTACHED DRAWINGS

The above embodiments of the present disclosure will be better understood after reading the detailed description of the embodiments of the present disclosure in conjunction with the following figures. In the figures, components are not necessarily drawn to scale, and components having similar related features may have the same or similar reference numerals.

REFERENCE NUMERALS

1000—vehicle
100—interior component
101—dashboard
102—door panel
1021—door panel insert
103—center console
10—interior trim
1—decorative layer
11—outer surface
12—inner surface
2—heating configuration
21—first heating layer
22—electrode 23—second heating layer
24—heating element
3—first isolating layer
4—second isolating layer
41—first glue layer
42—second glue layer
30—substrate
5—connector
51—protector
200—electronic control unit (ECU).

DETAILED DESCRIPTION OF EMBODIMENTS

The implementations of the present disclosure are described below by some embodiments. Embodiment of the present disclosure from the contents disclosed in the description. Although the description of the present disclosure is introduced together with other embodiments, it does not mean that the features of the present disclosure are limited to the embodiments. On the contrary, the purpose of introducing the present disclosure in combination with the embodiments is to cover other embodiments that may be extended based on the claims of the present disclosure.

It should be noted that in the following description, for example, “one embodiment”, “an embodiment”, and/or “some embodiments” refer to a feature, structure or characteristic related to at least one embodiment of the present disclosure. Therefore, it should be emphasized and noted that “an embodiment” or “one embodiment” or “one or more embodiments” mentioned twice or more in different positions in this specification do not necessarily refer to the same embodiment. In addition, some features, structures or characteristics in one or more embodiments of the present disclosure may be appropriately combined.

Although the interior trim and interior component disclosed in the embodiments of the present disclosure may be applied to automobiles, they are not limited thereto. For example, they can also be applied to other vehicles, such as railway train, ship, and airplane, as long as they are vehicles, the interior trim and interior component disclosed in the embodiments of the present disclosure can be applied.

In addition, compared with the current air-conditioning heating solution, the present disclosure improves the user experience and the heating efficiency, but it can be understood that this does not mean that vehicles equipped with the interior trim and interior component of the present disclosure cannot be equipped with heating air conditioners at the same time. For example, the interior trim and interior component of the present disclosure, as well as the heating air conditioner, can be set at the same time in a vehicle, and the interior trim and component parts of the present disclosure can correspondingly replace partial function of the heating air conditioner, to reduce energy consumption and further improve heating effect. The meaning of occupant described below is broad, that is, all persons in the vehicle are occupants, such as driver and passenger.

Figure 1:
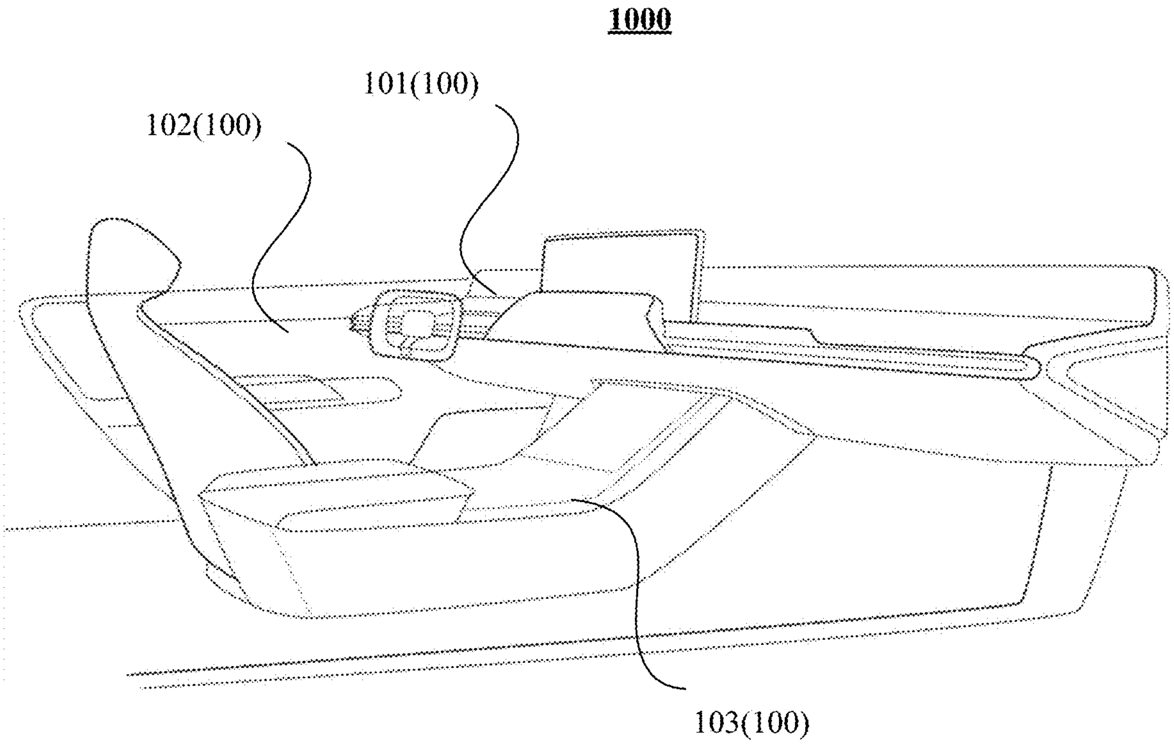
FIG. 1 is a structural diagram of a vehicle in accordance with some embodiments of the present disclosure.

Referring to FIG. 1, a vehicle 1000, taking an automobile as an example, includes an interior component 100, which may include, for example, a dashboard 101, a door panel 102, a center console 103, etc. Currently, the dashboard 101 and the door panel 102 are generally of a split structure, and the dashboard 101 and the door panel 102 can be visually distinguished from each other. However, it is not excluded that the structures of the dashboard 101 and the door panel 102 are similar, forming an interior system of the vehicle 1000 in which the dashboard 101 and the door panel 102 form an integrated visual perception.

Figure 2:
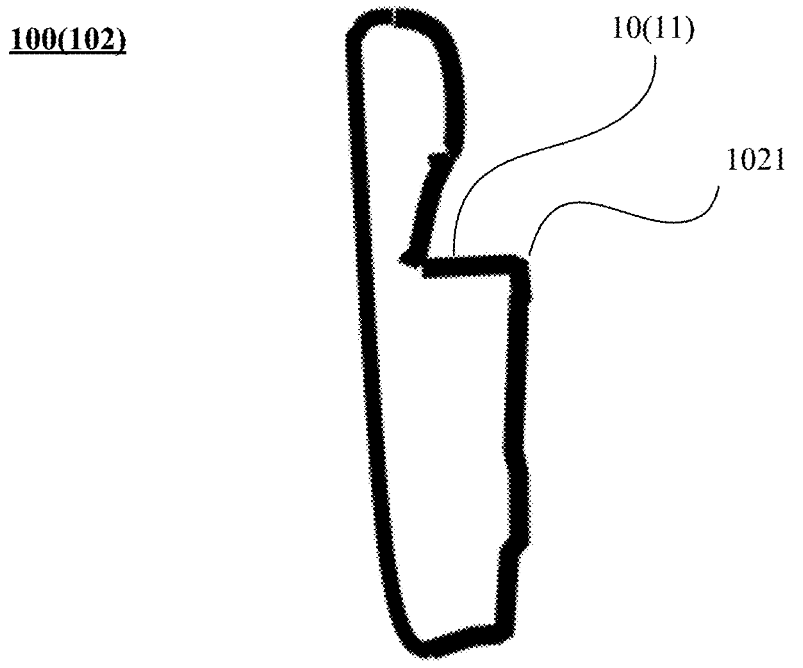
FIG. 2 is a structural diagram of an interior component in accordance with some embodiments of the present disclosure.

For an interior trim 10 described in the following embodiments, taking the door panel 102 shown in FIG. 2 as an example, because the position corresponding to the door panel 102 is a position where the current vehicle air conditioner is difficult to fully heat, the interior trim 10 is provided on the door panel and the occupant can relatively feel more heating. Referring to FIG. 2, in some embodiments, the interior component 100 includes an interior component body 101 and an interior trim 10, and the interior trim 10 is set on the interior component body 101, and an outer surface 11 of a decorative layer 1 of the interior trim 10 provides at least a portion of the surface of the interior component 100. For example, as shown in FIG. 2, the interior trim 10 is located at the door panel insert 1021 of the door panel 102.

Figure 3:
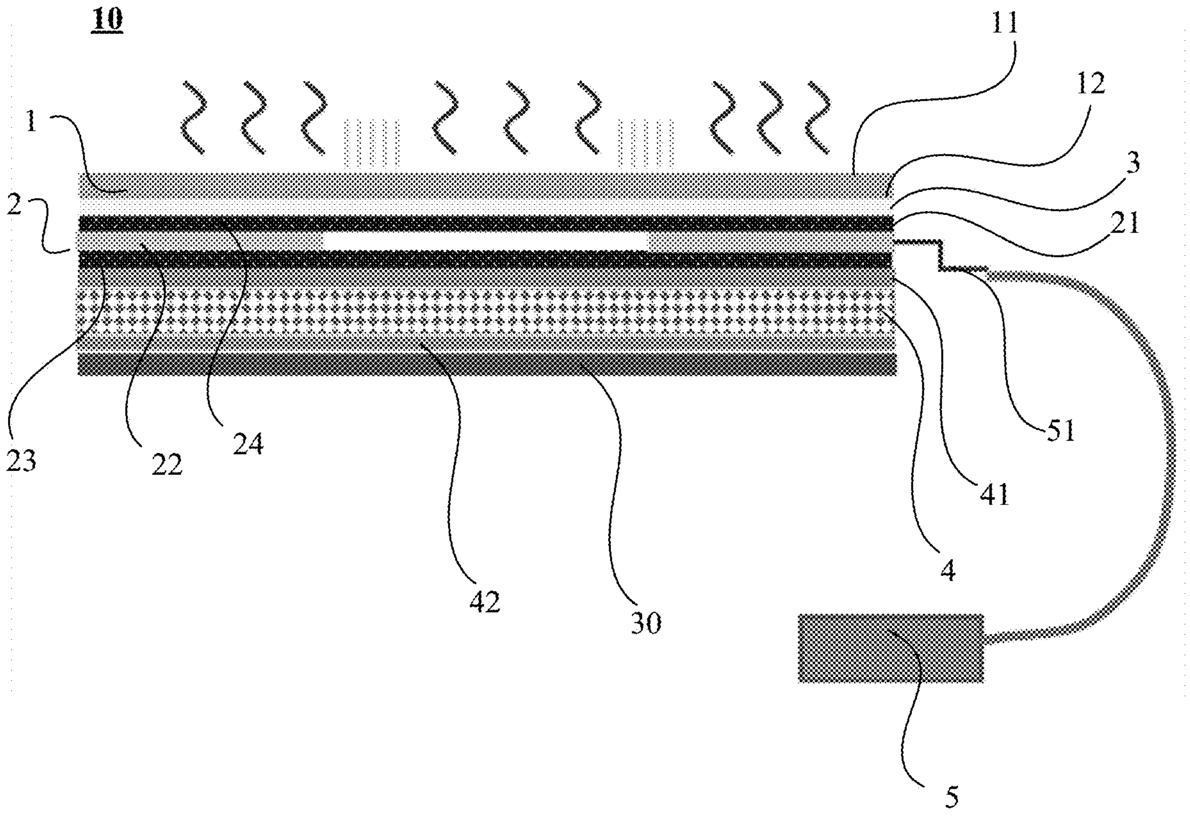
FIG. 3 is a structural diagram of an interior trim in accordance with some embodiments of the present disclosure.

Referring to FIG. 3, in some embodiments, the interior trim 10 includes a decorative layer 1 and a heating configuration 2 located on the inner surface 12 of the decorative layer 1. The word “inner” and “outer” here, that is, one side of the interior trim 10 close to the occupant is “outer”, and the other side opposite to it is “inner”.

The decorative layer 1 has an outer surface 11 and an inner surface 12 opposite the outer surface 11. The outer surface 11 is normally a surface on which the interior trim 10 provides direct contact or direct visibility to the occupant. The decorative layer 1 is also defined as the outermost layer of the interior trim 10, and normally serves to provide a directly visible decoration, so it is called a decorative layer. It can be understood that the decorative layer 1 may be made of plastic, fabric, leather, artificial leather, metal, or the like, or may be made of a composite of the above materials, for example, leather plus a substrate, such as commonly used artificial leather (PVC/PU/TPU, etc.) plus a substrate fabric with a total thickness of about 1.1 mm, or leather plus foam with a thickness of about 3 mm. The materials mentioned are used as examples only and are not intended to imply any limitations on materials, for example, additional treatments such as softening, polishing, corrosion-resistant coating, etc. can also be applied to the said materials. The decorative layer 1 may be flexible and thus can be overlaid on any 3D structure.

The heating configuration 2 includes a first heating layer 21, an electrode 22, and a second heating layer 23, and the heating configuration 2 is located on the inner surface 12 of the decorative layer 1, and the first heating layer 21 and the second heating layer 23 both include a heating element 24 extending in the plane of the heating layer, and the heating element 24 is made of a heating carbon material. The first heating layer 21 and the second heating layer 23 are directly connected with the electrode 22 on its outer side and inner side respectively to fix the electrode 22, and the first heating layer 21, the electrode 22 and the second heating layer 23 form a sandwich structure.

The heating carbon material here refers to a material that heats through the following principles: under the condition of electrification, carbon molecules produce atoms, ions and electrons, and friction and collision between carbon molecular groups (also known as Brownian motion) generate thermal energy, and the thermal energy is radiated through far-infrared rays with a wavelength of 5-14 microns. The heating carbon material may be a carbon material such as carbon nanotubes, carbon fibers, graphene, graphite, and carbon black. In some embodiments, the heating carbon material may include at least one of carbon nanotubes, carbon fibers, and graphene, and the carbon nanotubes may be in the form of single-walled carbon nanotubes, multi-walled carbon nanotubes, etc., and the carbon nanotubes, carbon fibers, and graphene may also be carbon materials having doped atoms. The beneficial effect of adopting at least one of carbon nanotubes, carbon fibers, and graphene is that the conductivity is better, the heat generation performance is more stable, and the electrothermal conversion efficiency is higher. Compared with traditional carbon materials, it has the characteristics of large power per unit area and high energy efficiency, which can make the heating configuration downsized and reduce energy consumption.

Detailed process by which the heating element 24 is made of the heating carbon material may be process by coating a slurry having the heating carbon material, and the slurry normally including a solvent, a heating carbon material ink, a dispersant, a binder, and other additives, with the mass percentages of each component selected on a case-by-case basis. The process of coating slurry may be a screen-printing process, but it is not limited to this. For example, it may also be realized by a coating process such as ultrasonic spraying.

The first heating layer 21 and the second heating layer 22 include heating element 24 extending in the plane of the heating layer, meaning that heating element 24 extends at least partially in the plane of the heating layer. The first heating layer 21 and the second heating layer 22 may be decorative by screen printing to form circuits having different visual shapes of figures, patterns, signs, words, images or symbols, or other decorative elements. Normally speaking, the graphic part of the screen printing is opaque, and the non-graphic part is transparent.

The sandwich-like structure formed by the first heating layer 21, the electrode 22, and the second heating layer 23 means that the electrode 22 is also a part that occupies a thickness space, and is fixed by the first heating layer 21 and the second heating layer 23 directly connected outside and inside, and the electrode 22 can be in a stable and reliable contact with the first heating layer 21 and the second heating layer 23, and the first heating layer 21 and the second heating layer 23 can be stably and reliably energized and excited. Especially in the operating scene of the vehicles facing vibration conditions, stably and reliably run is particularly important. In addition, because the electrode 22 is fixed on both sides by the first heating layer 21 and the second heating layer 23, the electrode 22 itself can use a relatively low-cost part, such as a copper wire mesh, instead of using a relatively expensive silver part, nor a process of forming the electrode by a silver screen printing, but only needs to directly arrange a prepared copper wire mesh on the first heating layer 21, and then perform a covering process of the second heating layer 23. In some embodiments, the heating element 24 of the first heating layer 21 is attached to the inner surface 12 side of the decorative layer 1 by screen printing; and the heating element 24 of the second heating layer 23 is attached to the electrode 22 by screen printing, and the first heating layer 21 and the second heating layer 23 can be fixed more reliably, and the shapes of the first heating layer 21 and the second heating layer 22 can be set by screen printing.

It can be seen from the above that the interior trim 10 and the interior component 100 described in the above embodiments have a beneficial effect that by using a heating element formed of a slurry of a heating carbon material as a heating layer, high-efficiency heating is realized, the heating of the interior trim is realized to provide a heating effect, and the heating effect can be provided to the parts of the occupant where the thermal air flow is difficult to reach. And it can reduce the dryness that the occupants feel similar to the heating of the air conditioner. In addition, the heating configuration include the first heating layer, the electrode and the second heating layer to form a sandwich-like structure, to realize the electrode to be manufactured at a low cost and be fixed stably, and the electrode can be stably and reliably contacted with the heating layer to stimulate the heating layer, and the manufacturing cost of the interior trim is low at the same time is able to provide reliable heating.

As shown in FIG. 3, in some embodiments, in a structure which the heating configuration 2 is located on the inner surface 12 of the decorative layer 1, a first isolating layer 3 may be provided between the first heating layer 21 at the outermost layer of the heating configuration 2 and the inner surface 12 of the decorative layer 1 to isolate the heating configuration 2 from the decorative layer 1. The first isolating layer 3 is provided to prevent the decorative layer 1 from being stretched too much, and at the same time to prevent imprints on the outer surface of the decorative layer 1 caused by coating different slurries. It can be understood that the first isolating layer 3 is not essential to be set, and if the decorative layer 1 itself is not sensitive to the tensile effect caused by the heating configuration 2 and the imprint caused by the coating, for example, the thermal expansion coefficient of the decorative layer 1 is small, and the color of the decorative layer 1 itself is darker, and the first heating layer 21 can be directly covered on the inner surface 12 of the decorative layer 1 by a process such as screen printing, spraying, etc.

Continuing with reference to FIG. 3, in some embodiments, the interior trim 10 may also include a substrate 30 set on the inner side of heating configuration 2, to support the heating configuration 2. The substrate 30 may be made of thermoplastic or rigid plastic polymers, including PET, MMA, PC, PU, ABS, PP, NFPP, etc. The thickness of the substrate 30 may be between 1 mm and 5 mm, in some embodiments between 2 mm and 2.5 mm. In some embodiments, the interior trim 10 may also include a second isolating layer 4 located between the second heating layer 23 and the substrate 30 to isolate the second heating layer 23 and the substrate 30, and the second isolating layer 4 may be adhered to the second heating layer 23 and the substrate 30 respectively through a first glue layer 41 and a second glue layer 42. The second isolating layer 4 may be a spacer fabric material, such as a composite fiber material (including synthetic fibers and natural fibers), or a material such as a felt. The second isolating layer is, in some embodiments, made of a material with better thermal insulation performance, to provide a protective effect, and at the same time to reduce heat loss caused by heat transfer to the inner side of the interior trim 10, that is, to the side of the substrate 30, to improve the thermal efficiency of the heating configuration 2.

Figure 5:
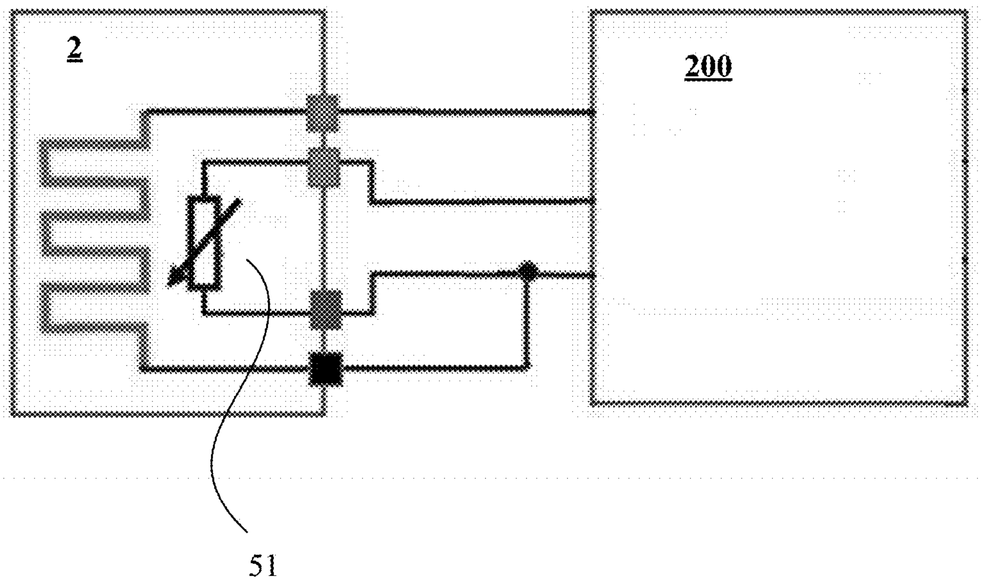
FIG. 5 is a schematic diagram of control architecture of an ECU connected to an interior trim for a vehicle in accordance with some embodiments of the present disclosure.

Referring to FIG. 3 and FIG. 5, the interior trim 10 may also include a connector 5 connecting the electrode 22 for electronically connecting to an electronic control unit (ECU) 200 to control the temperature of the heating configuration 2. The connector 5 is electronically connected to the control unit 200 to transmit and receive signals and control the heating function. The control unit 200 controls the temperature provided by the heating configuration 2 within a predetermined threshold of about 50° C., which approximately corresponds to the heating temperature of the carbon nanotube. In this way, the outer surface 11 of the decorative layer 1 can provide a comfortable temperature for the occupants, and the occupants will not have a burn feeling even when they accidentally touch the outer surface 11. And it is possible to detect and ensure that the temperature of the interior trim 10 does not exceed a predetermined threshold value by providing a protector 51. When the detected temperature is higher than a predetermined threshold value, the protector 51 disconnects the circuit between the electrode 22 and the control unit 200, or the protector 51 changes its own resistance value to adjust the current and voltage distributed to the heating element, to affect the power of the heating element. At least one of the NTC sensor and the PTC sensor may be selected as a selection for the protector 51. It can be understood that the control unit 200 herein may be spatially the control unit 200 located near the interior trim 10, or be integrated in the control unit 200 of the whole vehicle, and it is not excluded that the electrode 22 is wirelessly connected to the control unit 200, in addition to being wirelessly connected through the connector 5. The scheme of adopting the connector 5 has the beneficial effect that the connection is more reliable.

It can be understood that flowcharts are used in the present disclosure to illustrate operations performed by the system according to embodiments of the present disclosure. It should be understood that, depending on the actual situation, the preceding or following operations are not necessarily performed precisely in order. One can also add additional steps to these procedures, or remove a step or steps from them.

Figure 4:
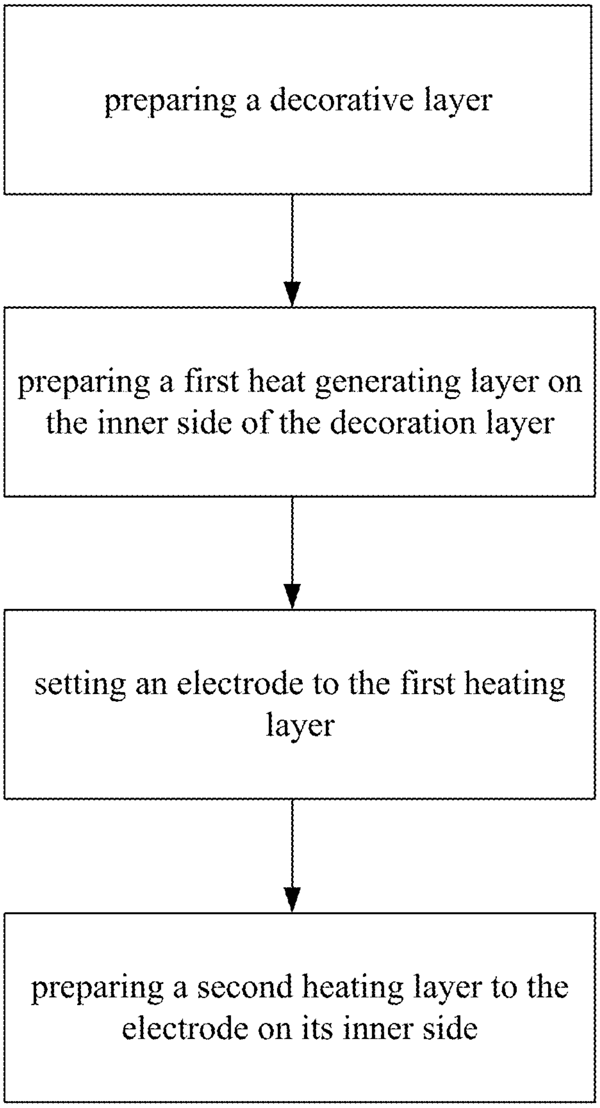
FIG. 4 is a flow chart diagram of a method of manufacturing an interior trim for a vehicle in accordance with some embodiments of the present disclosure.

As described above, with reference to FIG. 4, in some embodiments, the steps of a method of manufacturing an interior trim for a vehicle may include:

S1. preparing a decorative layer 1;

For example, the decorative layer 1 can be obtained by a process such as injection molding, or a decorative layer 1 can be obtained from a supplier.

S2. preparing a first heating layer 21 on the inner side of the decorative layer 1;

For example, as described above, using a screen-printed process to screen print the slurry having the heating carbon material on the inner side of the decorative layer 1, which may be directly printed, or printed to the first isolating layer 3 on the inner surface 12 of the decorative layer 1;

S3. setting an electrode 22 to the first heating layer 21;

For example, as described above, the electrode 22 is a copper wire mesh, and after the screen printing of the first heating layer 21 is completed, the copper wire mesh piece can be directly placed on the inner side of the first heating layer 21.

S4. Preparing a second heating layer 23 to the electrode 22 on its inner side.

For example, as described above, using a screen-printed process to screen print the slurry having the heating carbon material on the inner side of the decorative layer 1, to form the sandwich-like structure of the first heating layer 21, the electrode 22, and the second heating layer 23, and sufficient contact between the heating layer and the electrode and stable and reliable fixation are realized at a relatively low cost, and high heating efficiency of the interior trim is realized and a relatively comfortable heating experience for the user is realized.

In summary, using the interior trim, the interior component, and the manufacturing method described in the above embodiments have beneficial effects that, by using a heating element formed of a slurry of a heating carbon material as a heating layer, high-efficiency heating is realized, the heating of the interior trim is realized to provide a heating effect, and the heating effect can be provided to the parts of the occupant where the thermal air flow is difficult to reach. And it can reduce the dryness that the occupants feel similar to the heating of the air conditioner. In addition, the heating configuration include the first heating layer, the electrode and the second heating layer to form a sandwich-like structure, to realize the electrode to be manufactured at a low cost and be fixed stably, and the electrode can be stably and reliably contacted with the heating layer to stimulate the heating layer, and the manufacturing cost of the interior trim is low at the same time is able to provide reliable heating.

Although the above embodiments of the present disclosure are disclosed as above, they are not used to limit the present disclosure. Therefore, any amendments, equivalent changes and modifications made to the above embodiments according to the essence of the present disclosure without departing from the proposal of the present disclosure fall within the embodiments of protection defined in the claims of the present disclosure.

The invention claimed is:

1. An interior trim for a vehicle, comprising:

a decorative layer having an outer surface and an inner surface; and a heating configuration comprising a first heating layer, an electrode, and a second heating layer, and the heating configuration is located on the inner surface of the decorative layer; wherein the first heating layer and the second heating layer both comprise a heating element extending in a plane of the heating layer, and the heating element is made of heating carbon material; and the first heating layer and the second heating layer are connected with the electrode on its outer side and inner side respectively to fix the electrode, and the first heating layer, the electrode and the second heating layer form a sandwich-like structure.

2. The interior trim according to claim 1, wherein the electrode is a copper wire mesh.

3. The interior trim according to claim 1, wherein the heating carbon material comprises at least one among carbon nanotube, carbon fiber, and graphene.

4. The interior trim according to claim 1, wherein the heating element of the first heating layer is screen-printed on the inner surface side of the decorative layer, and the heating element of the second heating layer is screen-printed on the electrode.

5. The interior trim according to claim 1, wherein the interior trim further comprises a first isolating layer, and the first isolating layer is located between the first heating layer and the decorative layer, to isolate the first heating layer and the decorative layer.

6. The interior trim according to claim 1, wherein the interior trim further comprises a substrate, and the substrate is set on the inner side of heating configuration, to support the heating configuration.

7. The interior trim according to claim 1, wherein the interior trim further comprises a second isolating layer, and the second isolating layer is located between the second heating layer and a substrate, to isolate the second heating layer and the substrate.

8. The interior trim according to claim 1, wherein the interior trim further comprises a connector connecting the electrode, and the connector being connected to an electronic control unit (ECU) to control the operation of the heating configuration.

9. An interior component for a vehicle, comprising:

an interior component body; and an interior trim including a decorative layer having an outer surface and an inner surface; and a heating configuration comprising a first heating layer, an electrode, and a second heating layer, and the heating configuration is located on the inner surface of the decorative layer; wherein the first heating layer and the second heating layer both comprise a heating element extending in a plane of the heating layer, and the heating element is made of heating carbon material; and the first heating layer and the second heating layer are connected with the electrode on its outer side and inner side respectively to fix the electrode, and the first heating layer, the electrode and the second heating layer form a sandwich-like structure;

wherein the interior trim is set on the interior component body, and the outer surface of the decorative layer of the interior trim provides at least part of a surface of the interior component.

10. The interior component according to claim 9, wherein the electrode is a copper wire mesh.

11. The interior component according to claim 9, wherein the heating carbon material comprises at least one among carbon nanotube, carbon fiber, and graphene.

12. The interior component according to claim 9, wherein the interior trim further comprises a first isolating layer, and the first isolating layer is located between the first heating layer and the decorative layer, to isolate the first heating layer and the decorative layer.

13. The interior component according to claim 9, wherein the interior trim further comprises a substrate, and the substrate is set on the inner side of heating configuration, to support the heating configuration.

14. The interior component according to claim 9, wherein the interior trim further comprises a second isolating layer, and the second isolating layer is located between the second heating layer and a substrate, to isolate the second heating layer and the substrate.

15. The interior component according to claim 9, wherein the interior trim further comprises a connector connecting the electrode, and the connector being connected to an ECU to control the operation of the heating configuration.

16. A method of manufacturing an interior trim for a vehicle, comprising the following steps:

preparing a decorative layer;

preparing a first heat generating layer on the inner side of the decoration layer;

setting an electrode to the first heating layer; and preparing a second heating layer to the electrode on its inner side.

* * * * *